Dec. 26, 1950 G. L. ARDRON 2,535,828
MACHINE FOR LOADING CANS IN TRAYS IN STAGGERED
RELATION WITH DOUBLE ROW CAN FEED MEANS
Filed May 19, 1945 10 Sheets-Sheet 1
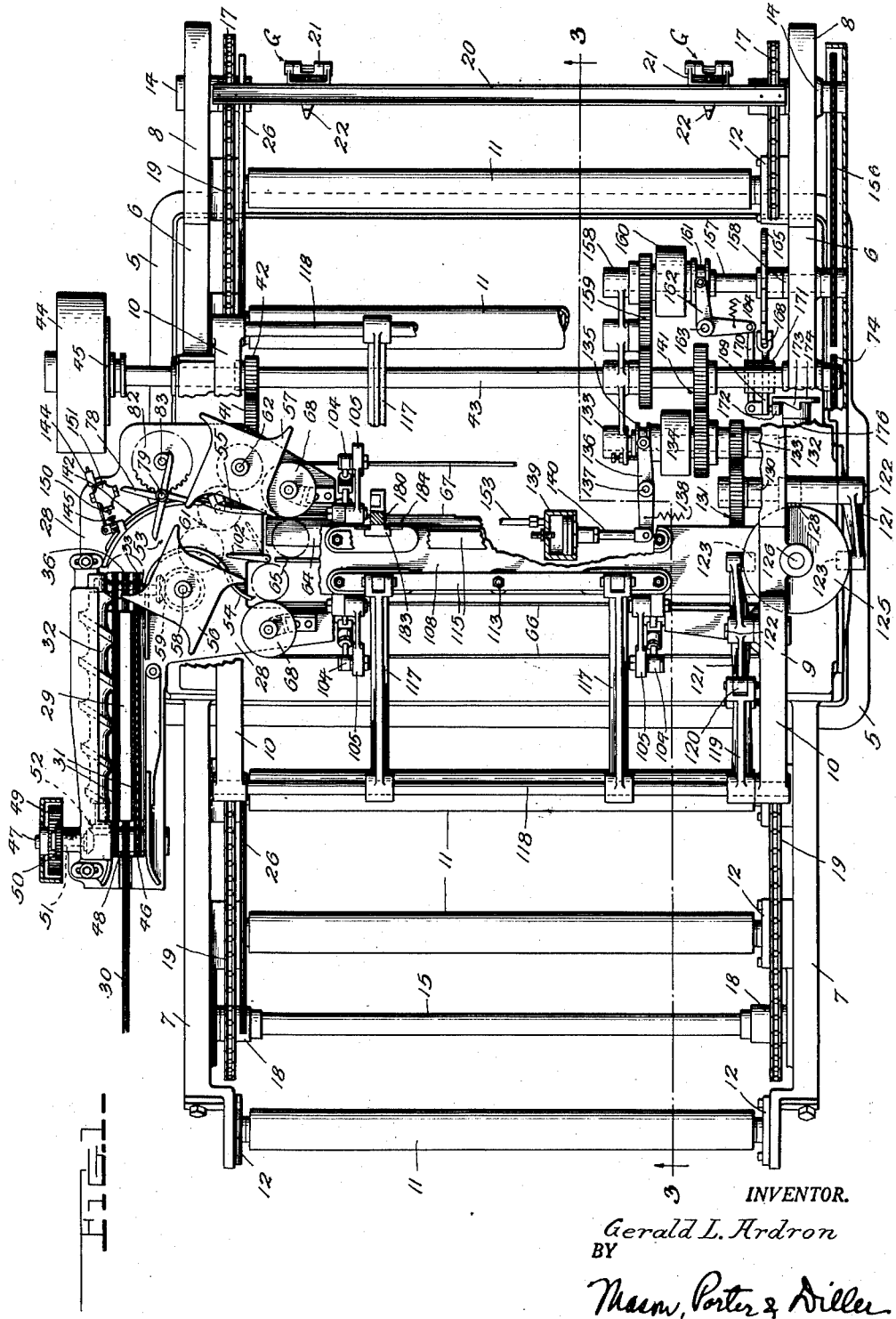
INVENTOR.
Gerald L. Ardron
BY
Mason, Porter & Diller
Attys.

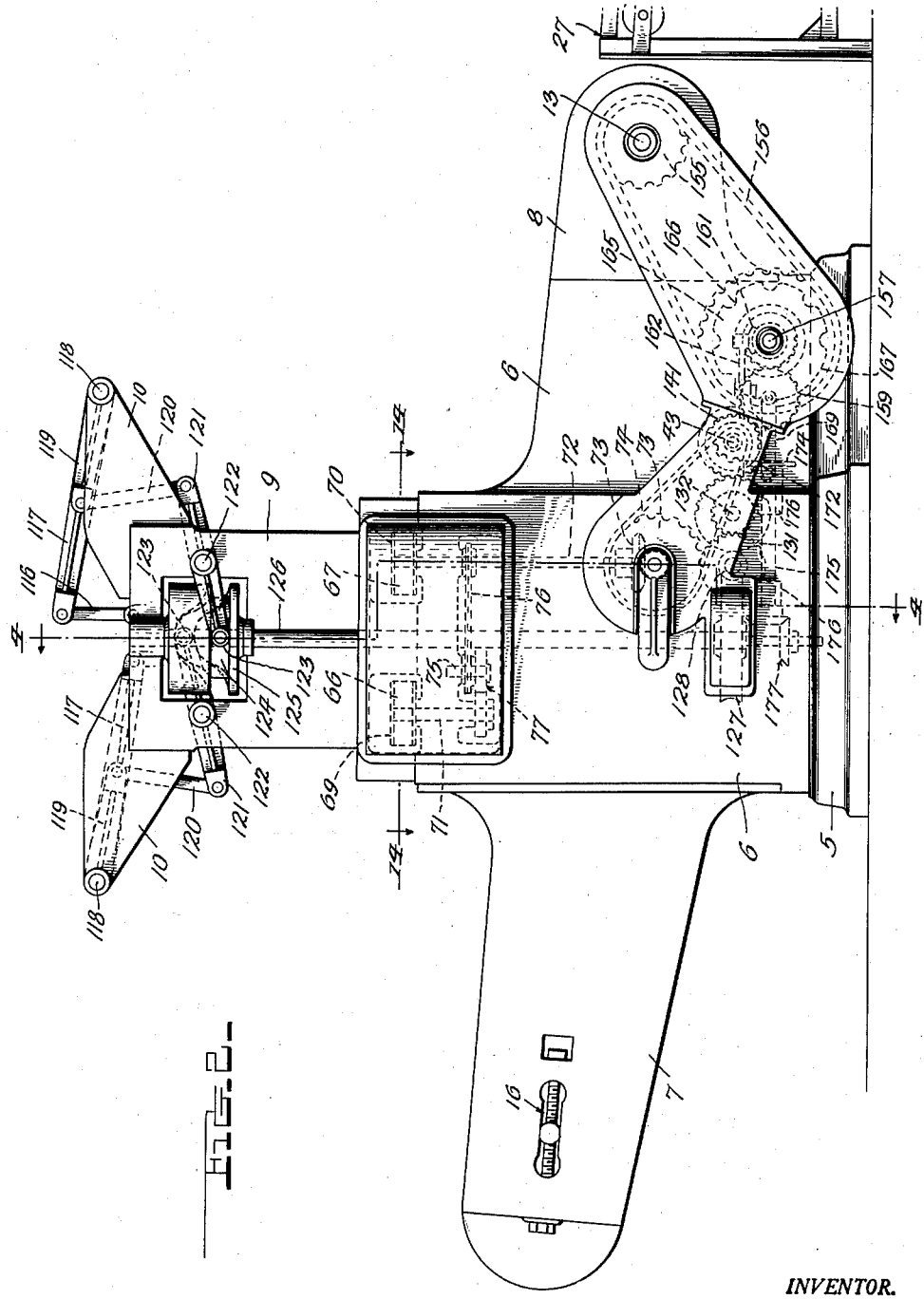

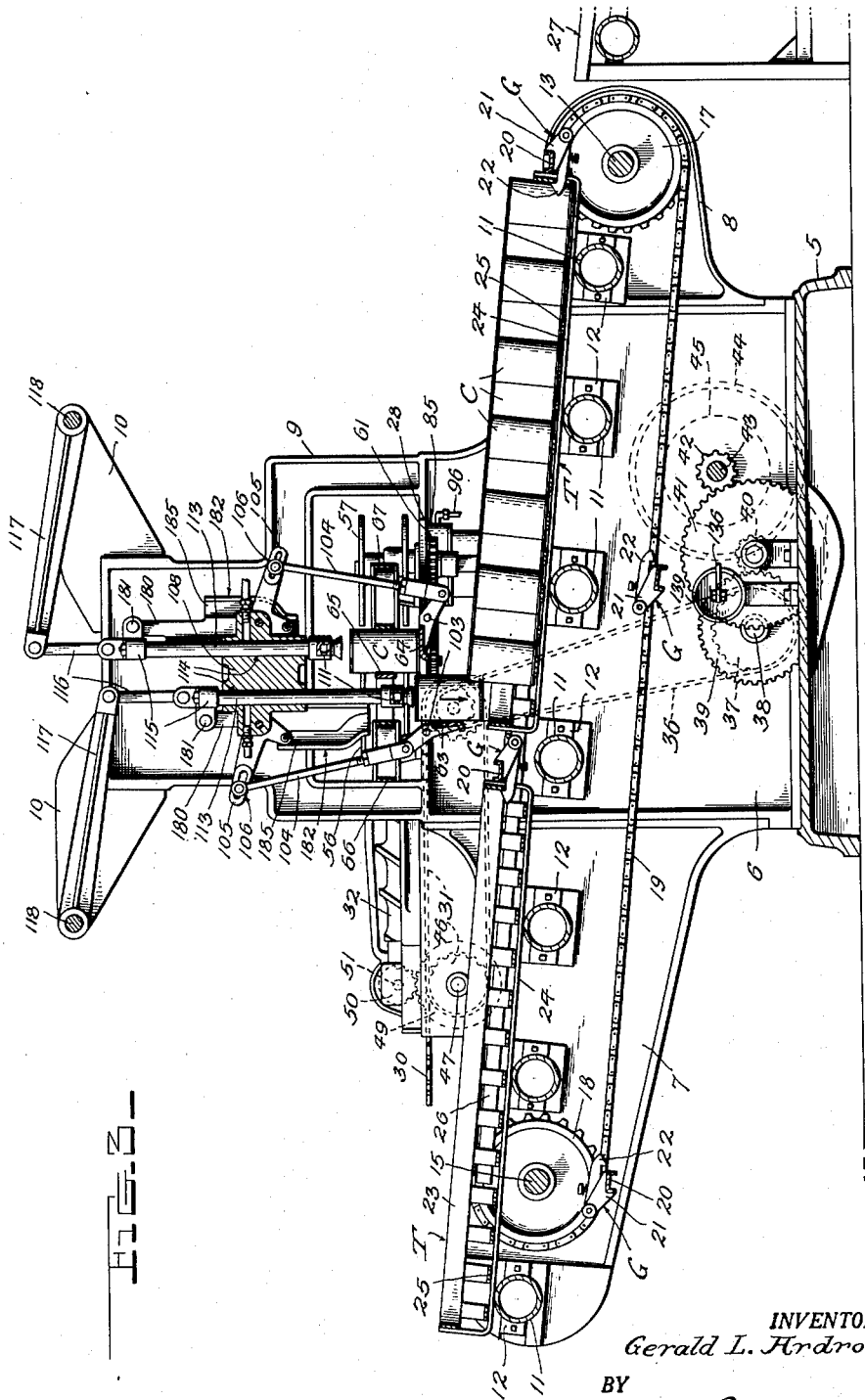

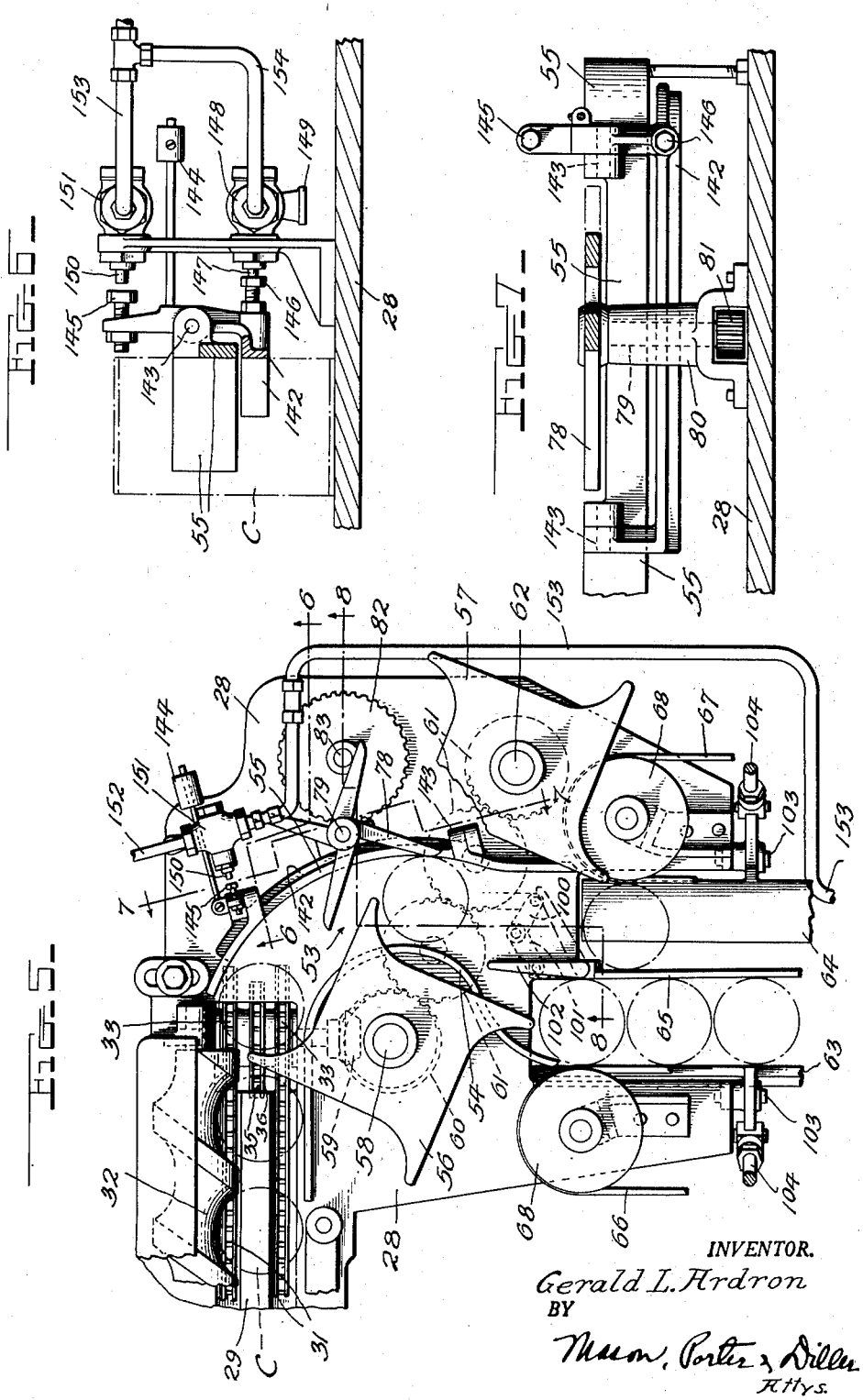

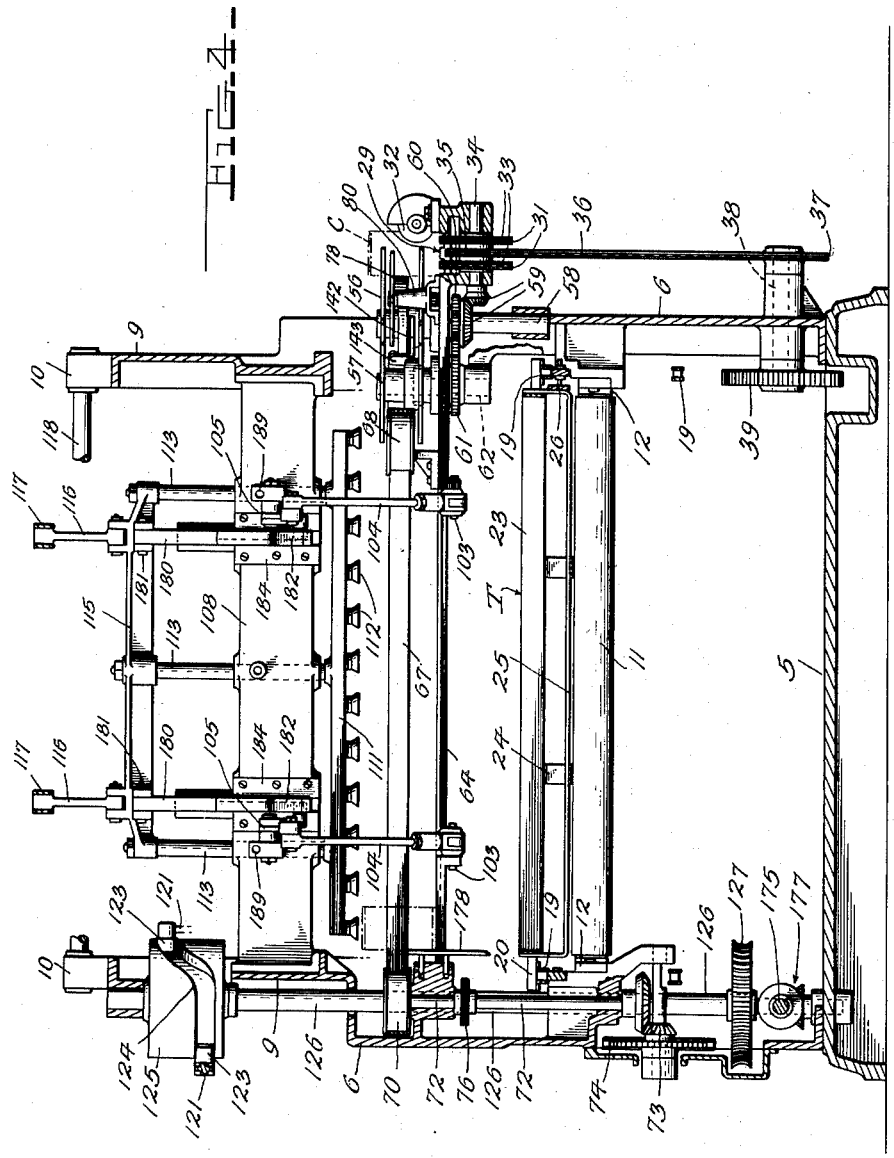

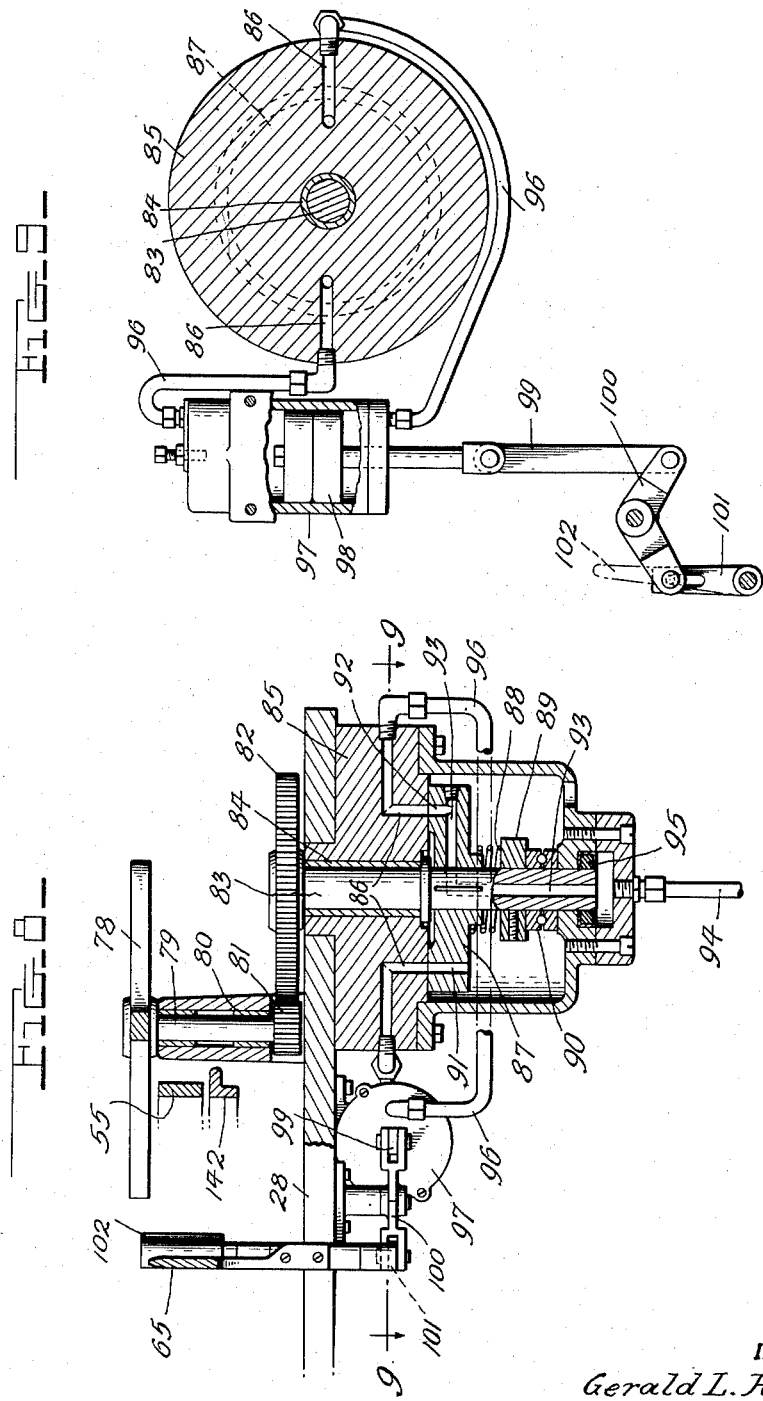

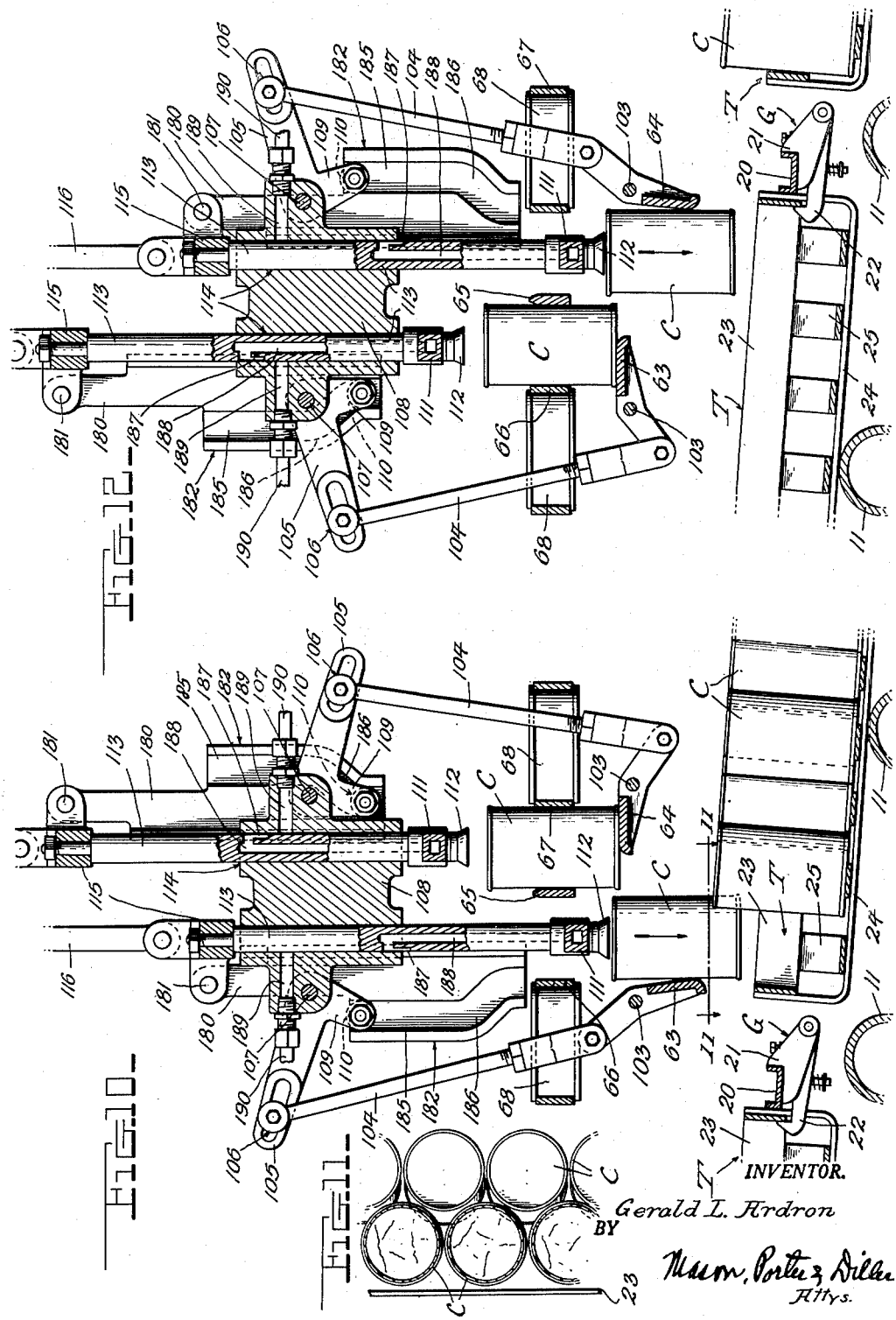

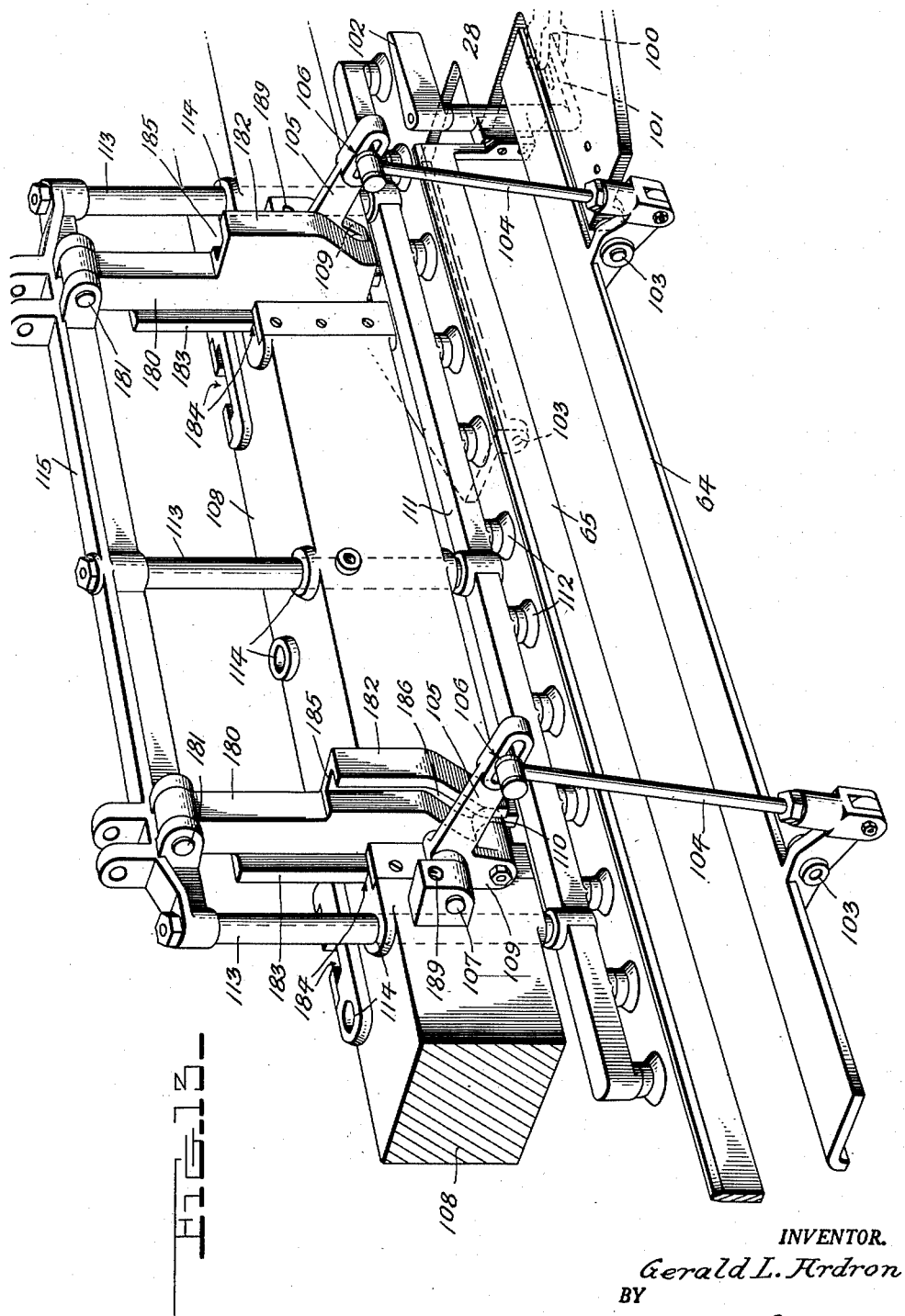

Dec. 26, 1950     G. L. ARDRON     2,535,828
MACHINE FOR LOADING CANS IN TRAYS IN STAGGERED
RELATION WITH DOUBLE ROW CAN FEED MEANS
Filed May 19, 1945     10 Sheets-Sheet 9
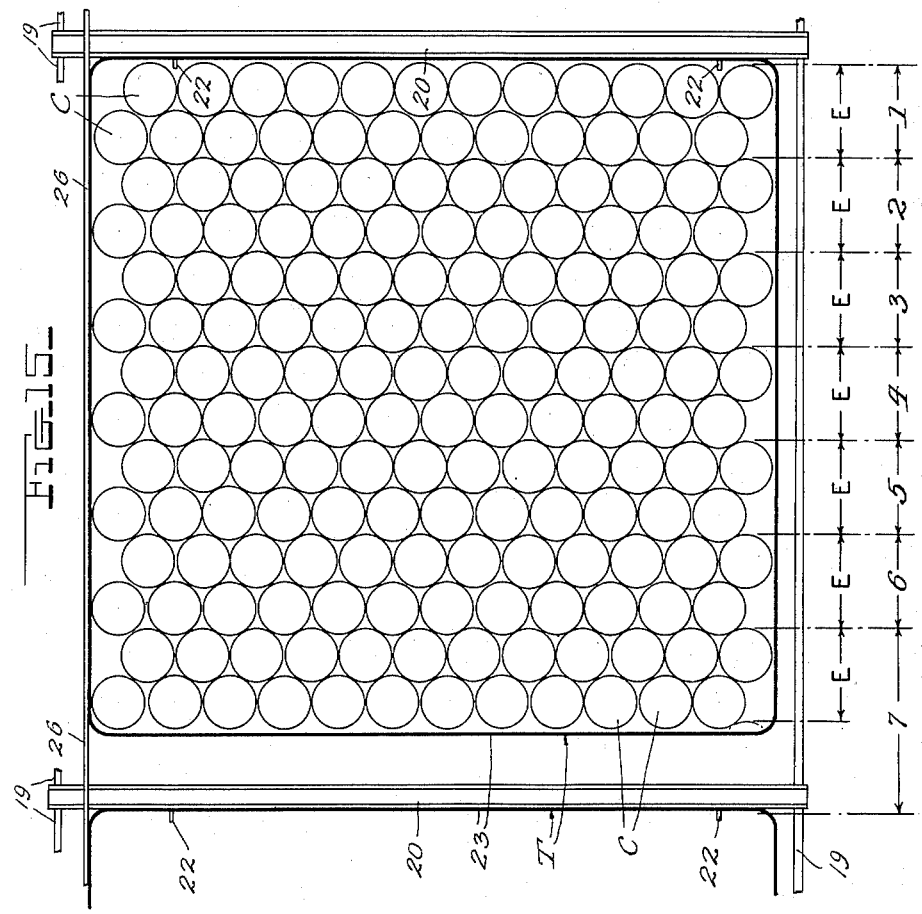
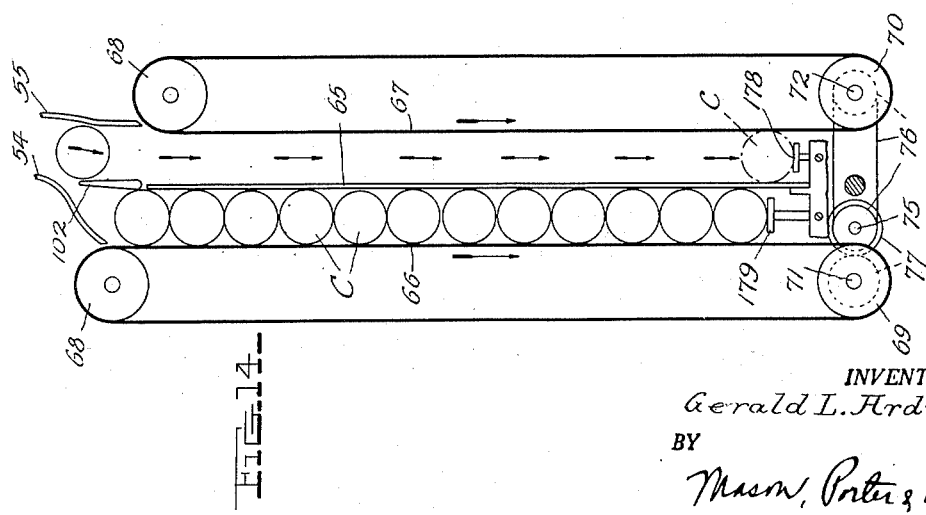
INVENTOR.
Gerald L. Ardron
BY
Mason, Porter & Diller
Attys.

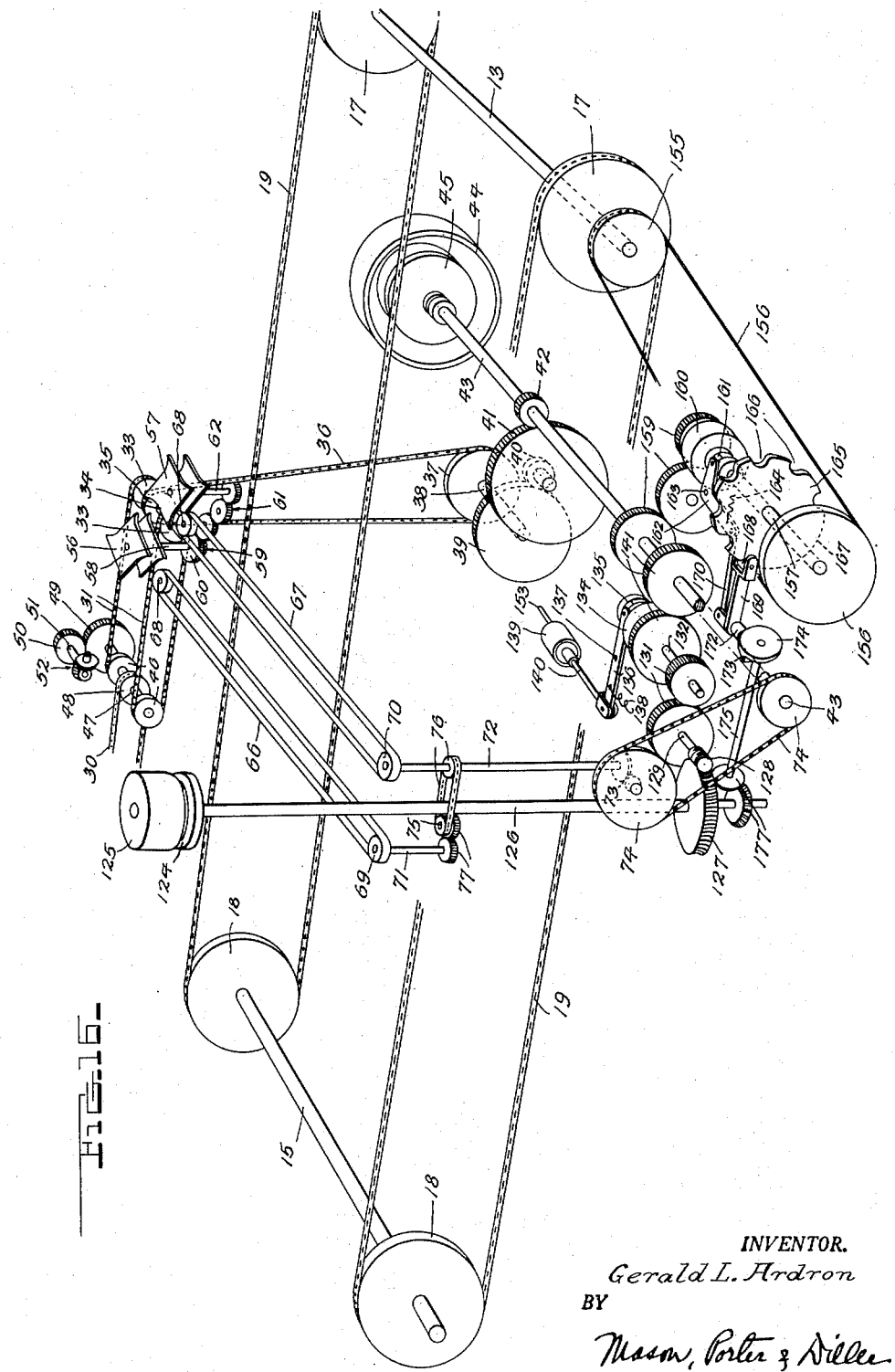

Patented Dec. 26, 1950

2,535,828

UNITED STATES PATENT OFFICE 2,535,828

MACHINE FOR LOADING CANS IN TRAYS IN STAGGERED RELATION WITH DOUBLE ROW CAN FEED MEANS

Gerald L. Ardron, Seattle, Wash., assignor to Continental Can Company, Inc., New York, N. Y., a corporation of New York Application May 19, 1945, Serial No. 594,674

35 Claims. (Cl. 226—15)

1

The invention relates generally to apparatus employed in the canning industry for the rapid handling of filled cans, and it primarily seeks to provide a novel apparatus for receiving filled cans as they are rapidly discharged in processional order from a closing machine and depositing them row beside row in trays in which they can be conveniently handled during cooling, processing or the like.

Present day canning operations are performed at speeds as high as three hundred cans per minute, or approximately 1.8 filled trays per minute, and unless rapid, automatically operable apparatus is employed it is impossible to fill and handle the trays with sufficient rapidity to keep pace with the speed at which the cans are filled and closed. It is the purpose of the present invention to provide such rapidly and automatically operated apparatus.

In its more detailed nature the invention seeks to provide novel apparatus of the character stated including a tray supporting conveyor, means for advancing the tray or the conveyor step-by-step, means for receiving the cans from the closing machine and assembling them in successive rows, and means for depositing the successively assembled rows of cans in the tray as it is advanced step-by-step.

An object of the invention is to provide novel apparatus of the character stated wherein is included means for arranging the successively assembled rows in staggered relation so that the rows will be deposited in alternately staggered, closely nested relation in the tray.

Another object of the invention is to provide novel apparatus of the character stated in which is included means for advancing the tray in step lengths each great enough to provide space for receiving two rows of cans, two parallel row supporting floors disposed transversely of and above the path of movement of the tray, means for feeding row complements of cans alternately onto the floors, and means for alternately lowering the floors in effecting deposition of the row complements of cans in the tray so that one such row complement is being deposited in the tray during the lowering of one floor while another such row is being made up or assembled on the other floor.

Another object of the invention is to provide novel apparatus of the character stated in which the can row complement supporting floors are so arranged and operated that as each said floor is lowered it serves as a guide aiding in the proper placement in the tray, and besides the pre-

2 viously deposited row of cans, of the can row complement previously supported thereby.

Another object of the invention is to provide novel apparatus of the character stated in which the cans are continuously fed in processional order to the two supporting floors, means being included for automatically switching the continuously fed cans from one floor to the other as the row complements of cans are successively and alternately assembled or made up thereon.

Another object of the invention is to provide novel apparatus of the character stated in which there is included means for automatically stopping the operation of the tray loading or can row depositing devices on the occurrence of any break in the continuity of the processional infeeding of cans, while maintaining the driving of the infeeding means, and then again automatically resuming operation of said devices upon resumption of proper infeeding of cans, thereby to assure against the depositing in the tray of incomplete rows of cans.

Another object of the invention is to provide novel apparatus of the character stated in which trays are moved on the conveyor in processional order and in spaced relation, and in which the trays are advanced step distances equivalent to the space in which to receive two rows of cans until a given tray is filled, and then said tray and the next following tray are advanced a step distance equivalent to the spacing between trays plus a distance equivalent to the space in which to receive two rows of cans.

Another object of the invention is to provide novel apparatus of the character stated in which the can row complements are lowered into the row receiving tray spaces by suction heads.

Another object of the invention is to provide novel apparatus of the character stated in which is provided suction control counting means for regulating the feeding of the cans in alternated row complements onto the receiving and assembling floors.

Still another object of the invention is to provide novel apparatus of the character stated in which the tray supporting conveyor is arranged on a downward and forward incline effective to minimize the load to be overcome in effecting advancement of the trays, and also to dispose the can rows in forwardly tilted relation to the horizontal so that the last deposited row of cans will in each instance act as a guide for the vertical, downward movement of deposition of the next following row.

With the above and other objects in view that will hereinafter appear, the nature of the invention will be more clearly understood by reference to the following detailed description, the appended claims and the several views illustrated in the accompanying drawings.

In the drawings:

Figure 1 is a plan view illustrating an apparatus embodying the invention, parts being broken away and in section.

Figure 2 is a side elevation illustrating the apparatus shown in Figure 1.

Figure 3 is a vertical longitudinal section taken on the line 3—3 on Figure 1.

Figure 4 is a vertical cross section taken on the line 4—4 on Figure 2.

Figure 5 is an enlarged fragmentary plan view illustrating the feed-in turrets, the counting mechanism and the distributing gate controlled by said mechanism.

Figure 6 is a detail vertical cross section taken on the line 6—6 on Figure 5.

Figure 7 is a detail vertical cross section taken on the line 7—7 on Figure 5.

Figure 8 is a detail vertical cross section taken on the line 8—8 on Figure 5.

Figure 9 is a horizontal section taken on the line 9—9 on Figure 8.

Figure 10 is an enlarged fragmentary vertical cross sectional view illustrating the placement of the final row of cans in a tray, the row of cans being placed in the tray just having been released from the suction head.

Figure 11 is a detail horizontal section taken on the line 11—11 on Figure 10.

Figure 12 is a view similar to Figure 10, showing the placement of the first row of cans in a tray.

Figure 13 is a perspective view illustrating one of the suction heads and the can row receiving and assembling floor or support with which it cooperates.

Figure 14 is a somewhat diagrammatic horizontal sectional view illustrating the manner of assembling the rows of cans on the alternately effective receiving floors or supports, the section being taken on the line 14—14 on Figure 2.

Figure 15 is a somewhat diagrammatic plan view illustrating the tray conveyor, one completely filled tray attached thereto, and a fragment of another unfilled tray, the steps in the feeding or advancement of the trays also being diagrammatically indicated.

Figure 16 is a somewhat diagrammatic perspective view illustrating the drive of the various parts of the apparatus.

In the apparatus herein disclosed as an example of embodiment of the invention, there is provided a frame structure including a base 5, right and left hand main side frame portions 6, right and left hand upper end side portions 7 and right and left hand lower end side portions 8.

Each of the main side portions 6 includes an upper extenison or upper structure 9 equipped at the upper end portion thereof with bearing extensions 10, the purpose of which will later become apparent.

The frame sides serve as supports for a plurality of rollers 11 having trunnion bearing in bearing members 12 secured on said sides in the manner clearly illustrated in Figures 1, 3 and 4 of the drawings. It will be apparent by reference to Figure 3 that the upper surfaces of the rollers 11 are so disposed as to provide an antifriction runway for tray structures later to be described, said runway being arranged on a slightly downward and forward incline.

A cross driver shaft 13 is rotatably mounted in fixed bearings in the lower side members 8, and a cross idler shaft 15 is rotatably mounted in longitudinally-adjustably supported bearings 16 in the upper side members 7. Driver sprockets 17 are secured on the cross shaft 13, and similar sprockets 18 idle on the cross shaft 15. The sprockets 17 and 18 disposed at one side of the frame structure serve to support a conveyor chain 19, and a similar chain 19 passes over the sprockets 17 and 18 at the opposite side of the frame structure. See Figures 1 and 3. Cross bars 20 are secured across the chains in equidistantly spaced relation, and each said bar is equipped with two tray grippers generally designated G and each including a bearing bracket portion 21 rigidly secured to the bar and a tray gripper hook 22 which is pivoted to the respective bracket member and is spring urged to the tray gripping position illustrated in Figures 3, 10 and 12.

It will also be apparent by reference to Figure 3 of the drawings that the conveying means provided by the supporting rollers 11, the chains 19, the bars 20 and the grippers G is long enough to support at least two of the can receiving trays generally designated T. Each tray is composed of a rectangular body strap portion 23 disposed above the bottom of the tray in position for being engaged by the grippers in the manner illustrated in Figures 3, 10 and 12, and a plurality of longitudinal and transverse strap members respectively designated 24 and 25 cooperatively arranged to provide an open mesh bottom and bent upwardly to form side extensions which are attached to the main body strap 23.

In the apparatus herein disclosed, it is intended that the trays T shall be placed on the means 11, 19 by hand, but it is to be understood that the trays may be mechanically placed by any suitable means, if desired. In order to facilitate the accurate placing of the trays T, a guide rail 26 is provided along the left hand side of the framing, and when each tray is placed on the conveying means, it is pressed laterally against the guide rail 26 and forwardly against the cross bar 20 to which it is to be secured by the grippers G and drawn along over the supporting rolls 11. It will be obvious by reference to Figures 3, 10 and 11 of the drawings that as each tray T is pressed forwardly against the respective cross bar 20, the forwardly presented transverse portion of the body strap 23 of the tray will engage the ends of the gripper hooks 22 and displace them downwardly, after which the hooks will spring up behind the body strap portion in the manner illustrated in Figures 10 and 11 so that movement of the chains 19 in the forward and downward direction will serve to advance the tray over the roller supports 11.

The apparatus herein described is designed to load trays constructed in the manner illustrated in Figures 3, 4, 10, 12 and 15, but it is to be understood that trays constructed and proportioned in a different manner may be loaded by the novel apparatus comprising the invention. When trays of the form herein disclosed are to be loaded, the trays measure 37½″ x 37½″ inside the body strap 23, and the cans C herein shown as loaded in the trays are of the one pound tall size. It will be apparent by reference to Figure 15 that the trays receive fourteen rows and that there are twelve cans in each row. It will also be apparent that the rows are alternately staggered so as to compact or nest the rows. In other words, the rows of cans will contact, with the centers of the cans of alternate rows centered between lines drawn through the centers in the longitudinal or feeding direction of the cans of the other alternate rows. This staggering of rows or nesting of the cans is accomplished by the provision of stop means arranged in a novel manner as illustrated in Figures 4 and 14, and the structure and function of these stop members will be described in greater detail hereinafter. There will also be described hereinafter novel means for advancing the trays step-by-step so as to enable the loading of the trays by the alternate lowering of the floors 64 and 63 and the alternated vertical reciprocation of the suction devices in the manner illustrated in Figures 10 and 12. The tray advancing means to be described hereinafter serves to advance the trays through successive steps indicated by the numerals 1 through 7 in the diagrammatic view on Figure 15. It will be noted that the first six steps are equidistant and correspond to the distances designated E. Seven such step distances E, each representing the space into which two rows of cans can be deposited, make up the total space necessary to receive the fourteen rows of cans C which are received in the tray. It will be noted that the feed step distance 7, in this illustration, is exactly twice the step distance E, and this long feed step corresponds to the distance E, or the space in which the last two rows of cans are received, plus the distance necessary to place the advance end of the next succeeding tray T in position to receive two alternately deposited rows of cans. In this illustration the step distance 7 is exactly twice the length of the step distances E and in any arrangement of the apparatus this step distance must be a distance equal to a step distance E plus the space between the trays. It will be apparent that when each tray has been fed six step distances E, it will be in position for receiving the last two alternately deposited can rows C, and after these last two rows are deposited in the tray, said tray will be advanced the long step distance designated 7 in Figure 15 which is sufficient to place the next succeeding tray in position beneath the can row assembling floors as shown in Figure 12.

At the left side of the machine there is provided a table 28 including a feedway 29 onto which the cans C are delivered by a feed chain 30 or other conveying device from the closing machine. See Figures 1, 4 and 5. The cans are moved over the feedway 29 by chains 31, the movement thereof being timed by the timing screw 32, and the chains pass over sprockets 33 on a driver shaft 34. It will be apparent by reference to Figures 4 and 16 of the drawings that the shaft 34 also has a driver sprocket 35 fixed thereon, and rotation is imparted to said shaft by a chain 36 from a sprocket 37 on the shaft 38. The shaft 38 is driven through a gear train 39, 40, 41 and 42, and the last mentioned gear 42 is fixed on the main power shaft 43 which is driven through the pulley 44 whenever the clutch 45 is shifted to the effective or driving position. Any suitable conventional form of clutch may be employed.

The can feeding chains 31 pass over sprockets 46 secured on a driver shaft 47 which also carries a sprocket 48 over which the previously mentioned chain 30 passes. The shaft 47 has a driver gear 49 fixed thereon, and this gear drives a gear 50 on a shaft 51 connected by a bevel gear couple 52 with the previously mentioned timing screw 32.

It will be apparent by reference to Figures 1 and 5 that as the cans C reach the ends of the feeder chains 31 they pass into an arcuate feedway 53 between concentrically spaced arcuate guides 54 and 55. The cans are fed over the arcuate feedway 53 by two turrets or star wheels respectively designated 56 and 57. The star wheel 56 is mounted on the upper end of a shaft 58 which is driven through a bevel gear couple 59 by the driver shaft 34. The shaft 58 also has a gear 60 fixed thereon which cooperates with the gear train 61 to impart rotation to the shaft 62 on which the other star wheel 57 is mounted.

The major portion of the arcuate feedway 53 is just wide enough to receive one can, but at the delivery end thereof said feedway flares or widens so as to direct the cans onto one or the other of two can row supporting and assembling floors 63 and 64. It will be apparent by reference to Figures 3, 4, 5, 10, 12 and 14 that the floors 63 and 64 are disposed side by side in parallel relation transversely of and above the tray conveying feedway. A rigid separator wall 65 is disposed above and between the floors 63 and 64 and cooperates at each of its front and rear faces with one flight of each of two endless conveyors 66 and 67 which pass over idler pulleys 68 at the receiving ends, and over driver pulleys 69 and 70 at the other ends of the can row supporting and assembling floors.

One belt driving pulley 69 is mounted on the upper end of a shaft 71, and the other driver pulley 70 is mounted on the upper end of a shaft 72, the latter being driven by a bevel gear couple 73 and sprocket and chain connections 74 from the previously mentioned main power shaft 43. The shaft 72 serves to drive an idler shaft 75 through sprocket and chain connections 76, and the idler shaft 75 imparts its rotation to the shaft 71 through a gear couple 77. See Figures 2, 4, and 16.

A counter wheel 78 having four equidistantly spaced fingers is mounted in position for having its fingers extend over the arcuate feedway 53 through which the cans are individually moved by the cooperating star wheels 56 and 57, and the star wheel is turned one-quarter turn by engagement therewith of each passing can. The shaft 79 on which the counter wheel 78 is mounted is rotatable in a bearing 80 and has a driver pinion 81 secured on the lower end thereof. The pinion 81 engages with and imparts rotation to a large gear 82. The ratio of the gears 81 and 82 is such that each complete revolution of the counter wheel 78 represents the passage of four cans and imparts one-sixth of a revolution to the large gear 82. It will therefore be apparent that six complete rotations will be imparted to the counter wheel 78 during passage of twenty-four cans, and that each complete revolution of the large gear 82 represents the passage of twenty-four cans.

The large gear 82 is secured on the upper end of a shaft 83 which is rotatable in a bearing 84 in a head 85 which is fixedly secured to the undersurface of the table 28 in the manner illustrated in Figure 8. The head 85 is equipped with two diametrically oppositely disposed ducts 86 opening through the bottom face thereof, said face being opposed by a control valve disk 87 which is splined on the shaft 83 and is tightly pressed against the head 85 by a compression spring 88 interposed between the disk and an abutment collar 89 secured on the shaft 83 and resting on an anti-friction bearing 90. The valve plate 87 has an aperture therethrough effective when brought into registry with one or the other of the head ducts 86 in the manner illustrated in Figure 8 to open the particular duct to atmosphere. The plate valve also has a vacuum port 92 which is diametrically oppositely disposed with respect to the atmosphere port 91 and is connected, by a duct 93 extending through the body of the plate and the shaft 83, with a vacuum line 94. A seal 95 is provided so as to prevent air leakage about the shaft 83 and into the vacuum line.

The head ducts 86 are connected by lines 96 with the opposite ends of a gate operating cylinder 97, the piston 98 in which cylinder is link-connected as at 99 with one arm of a bell crank lever 100 in the manner clearly illustrated in Figures 8 and 9. The other arm of the bell crank lever is connected to a crank 101 secured on the lower end of the shaft which supports the can diverting gate 102 which is adjustably mounted in the discharge portion of the arcuate feedway 53 in position for directing the cans onto the can row complement assembling floor 64 when positioned as illustrated in full lines in Figure 5 and for directing the cans onto the can row complement assembling floor 63 when positioned as illustrated in dotted lines in said figure.

It will be apparent by reference to Figures 5, 12 and 13 of the drawings that each floor 63 or 64 is pivotally mounted at its ends as at 103, and each floor includes crank extensions which are connected by pitmen 104 of adjustable length to bell crank levers 105 through the medium of adjustable slot connections 106. The bell crank levers 105 are pivoted as at 107 on the crosshead 108 and include short crank arm portions 109 which carry rollers 110 which form a part of the means for alternately lifting and lowering the floors 63 and 64 in the manner illustrated in Figures 10 and 12 and which will be described in greater detail hereinafter.

A hollow suction head 111 extends longitudinally over each of the can row complement supporting and assembling floors 63 and 64, and each head carries a plurality of depending suction cups 112 corresponding in number to the number of cans to be placed in each row in the tray. It is to be understood that the suction cups 112 on the respective suction heads or manifolds 111 are staggered in the same manner in which the can rows are to be staggered in the trays, as illustrated in Figure 15.

Each suction head 111 is supported at the lower end of three support rods 113 which extend upwardly through and are line guided in bearings 114 provided in the crosshead 108. At their upper ends the support rods 113 supporting each suction head 111 are secured to and depend from a crosshead 115 which is link-connected as at 116 with a pair of crank arms 117 secured on a rock shaft 118 which is rockably mounted in the bearing extensions 10 provided at the upper extremity of the side frame superstructures 9. Each shaft 118 has a crank arm 119 secured thereon adjacent one side frame, and each crank arm 119 is link-connected as at 120 with an actuator arm 121 pivoted intermediate its ends as at 122 on the adjacent side frame portion 9. The other end of each actuator arm 121 is equipped with a roller 123 which engages in a groove 124 provided in a rotary cam 125 secured on the upper end of a cam shaft 126 which is rotatable in suitable bearings provided on the side frame. The shaft 126 has a worm wheel 127 secured to the lower end thereof as shown in Figures 2, 4, and 16 and has rotation imparted thereto by a worm gear 128 which is secured on a driver shaft 129 rotatably mounted in the frame bearing 130. The shaft 129 is driven by a gear couple 131 from a shaft 132 mounted in suitable bearings 133 whenever the clutch 134 is effectively adjusted by the shifter member 135. The shifter member 135 is shiftable by a lever 136 which is pivoted intermediate its ends as at 137 and is normally held by a spring 138 in the clutch engaging position.

A clutch actuator cylinder 139 is provided and has its piston connected as at 140 with the free end of the clutch shifting lever 136. When the clutch is in the normally effective or loading means driving condition, the shaft 132 is driven through a gear couple 141 from the main driver shaft 43.

In order to discontinue the driving of the loading devices when a break occurs in the continuity of the infeeding of cans, there is provided a control sector 142 which is disposed beneath the arcuate guide 55 and pivotally supported thereon as at 143. See Figures 5, 6 and 7. An adjustable counterweight 144 constantly tends to project the sector 142 into the path of travel of the cans C so as to be displaced by each can moved through the arcuate feedway 53 by the star wheel 56. The sector 142 carries an abutment member 145 above the pivotal mounting 143 thereof, and a similar abutment member 146 is carried below the pivotal mounting of the sector in the manner clearly illustrated in Figures 6 and 7. Since the can being moved through the arcuate feedway 53 by a given finger of the star wheel 56 will still be in engagement with the control sector 142 when the can engaged by the next succeeding star wheel finger is brought into contact therewith, the lowermost abutment member 146 will normally be held in engagement with the actuator button 147 of the valve 148 for holding the same open and admitting air through inlet 149 thereof. However, should a break in the infeeding of the cans C occur, even to the extent of a single can, the counterweight will move the segment 142 inwardly over the arcuate feedway 53 and cause the upper abutment member 145 to engage the actuator button 150 of the vacuum control valve 151 which is connected by a line 153 with the previously described clutch actuator cylinder 139. The air valve 148 is connected by a line 154 to the line 153 leading to the stop cylinder 139, and it will be apparent that when the normal condition of the parts illustrated in Figure 6 pertains, there will be air at atmospheric pressure within the actuator cylinder 139. Each time the valve 151 is opened in the maner above described, however, the interior of the cylinder 139 will be evacuated through the line 153, the air valve 148 being closed, and the piston will be retracted in a manner for shifting the clutch 134 to the drive breaking condition.

Conveyor indexing or tray advancing movement is provided by securing a driver sprocket 155 on the driver shaft 13, said sprocket being driven by sprocket and chain connections 156 with the indexing shaft 157 which is rotatable in frame bearings 158. The indexing shaft 157 is driven from the main power shaft 43 through a gear couple 159 whenever the clutch 160 is in effective or drive condition under the control of the shifter 161. The shifter is operated by a bell crank lever 162 which is pivoted at 163 and is normally held in the clutch disengaging position by a spring 164.

It is to be understood that in the indexing or step-by-step advancement of the tray conveying chains 19, it is unnecessary to heavily load the indexing devices since the trays mounted on the anti-friction roller 11 would be disposed on an incline as indicated in Figure 3. Thus it is necessary to do no more than to overcome the inertia of the trays by initiating the indexing movement through the effectively connected driver devices 159, 160, 157, 156 and 155, and then to accurately stop movement of the conveying means after the trays have been advanced the desired definite step.

In order to accurately stop the tray advancing the trays have been advanced the desired definite indexing steps described in connection with Figure 15, a disk 165 is secured on the shaft 157, said disk having stop notches 166 in its periphery. Seven such notches are provided corresponding to the seven step stations indicated by the numerals 1 through 7 on Figure 15, and these notches are placed in consecutive, equidistantly spaced relation with a double space between two thereof as indicated at 167 and corresponding to the double feed step indicated at 7 in Figure 15.

A roller 168 engages in the notches 166 of the disk 165 and is carried by a bar 169 which is link-connected as at 170 to the bell crank lever 162 and is slidable in a suitable bearing 171. The bar 169 also carries a roller at its link-connected end which is disposed to be engaged by the hump 173 on a plate cam 174 secured on the end of a shaft 175 rotatably mounted in bearing means 176 and which is driven through a bevel gear couple 177 from the previously described cam shaft 126.

It will be apparent from the foregoing that whenever a break in the continuity of the infeeding of cans C occurs, even to the extent of a single can, shifting of the control sector 142 will evacuate the stop cylinder 139 and bring about a disengagement of the clutch 134, thereby discontinuing operation of all can loading devices, the can row supporting and placing devices 63, 64, 112 controlled by rotation of the cam 125, and also the tray advancing chains 19. However, since the feedin chains 31, the timing spiral 32, the turrets or star wheels 56 and 57 and the belts 66 and 67 are in continuous operation as long as the clutch 45 is engaged, it will be apparent that loading operations will start immediately upon contact of the next can with the control segment 142 which will effect an opening of the air valve 148 and a re-engagement of the clutch 134 in the manner hereinabove described.

*Operation*

As the cans C are fed into the apparatus in processional order by the chains 30 and 31, they will be advanced by the star wheels 56 and 57 over the arcuate feedway 53 and onto one or the other of the can row complement supporting and assembing floor 63 or 64 to the position of the diverting gate 102 which is controlled by the counting wheel 78 in the manner hereinbefore described. As each can moves onto the particular floor 63 or 64 it will be moved along by the engaging flight of the belt 66 or 67, and the feeding of cans onto the then elevated floor 63 or 64 will continue until the full complement of twelve cans has been fed onto said floor in the manner illustrated at the left in Figure 14, at which time the gate 102 will be shifted to the position illustrated in Figures 5 and 14 to divert the cans onto the other floor which will be elevated in time to receive the first can fed thereonto. It will be apparent by reference to Figures 4 and 14 of the drawings that differentially placed stops 178 and 179 are placed at the right hand ends of the respective floors 64 and 63, and the placing of the stops in the manner clearly illustrated in Figure 14 serves to stagger the rows and provide the desired nesting thereof in the manner hereinbefore described and as illustrated in Figure 15.

The cam 125 makes one complete revolution for every twenty-four cans entering the loading station occupied by the floors 63 and 64, or in other words a half revolution for the loading of each said floor with a row complement of twelve cans. Therefore, by reason of the connection of the cam operated crank devices 117, 119, 121 by the cam 125, the vacuum cup supporting crossheads 115 will be alternately lifted and lowered, one thereof being lowered to effect placement of a row complement of cans in the tray while the other is held elevated while the row complement of cans is being made up on the supporting floor 63 or 64 associated therewith. See Figures 10 and 12. It will be observed that each crosshead 115 carries two slides 180 depending therefrom on pivotal connections 181, and each slide includes an actuator cam portion 182 and guide flanges 183 which are slide guided in guides 184 provided therefor in the crosshead 108. See also Figure 13. Each actuator cam portion 182 has a groove formed therein for receiving one of the previously mentioned actuator rollers 110, and each groove includes a vertical portion 185 and an angle actuator portion 186.

It will be apparent by reference to Figures 10, 12 and 13 that as each crosshead 115 is lowered from its elevated position illustrated at the right in Figure 10 and at the left in Figure 12 the angled cam portions 186 of the slide members carried thereby will act on the rollers 110 in a manner for lifting the pitmen 104 and lowering the respective floor 63 or 64 in the manner illustrated at the left in Figure 10 and at the right in Figure 12. The parts are so timed that at the instant of contact between the vacuum cups 112 with the underlying assembled row complement of cans C the extension leg 187 in the support rod duct 188 communicating with the interior of the suction head or manifold 111 and the associated cups 112 will communicate with the suction duct 189 in the crosshead 108 and its line connection at 190 with a vacuum source, and thus the respective set of suction cups 112 will be attached to the assembled row of cans. After this attachment occurs the respective supporting floor 63 or 64 will swing downwardly in the manner illustrated at the left in Figure 10 or at the right in Figure 12 and permit lowering of the row of cans into the trays, and it will be apparent by reference to said Figures 10 and 12 that the floors 63 and 64 act in their lowered positions as guides for facilitating accurate placement of the can rows in the trays. It will also be apparent by reference to Figure 10 that by reason of the forward and downward tilting of the tray supporting conveyor means, the can rows deposited in the tray will have their centers directed upwardly and slightly forwardly in the manner illustrated in Figures 10 and 11, and it will be obvious that by lowering the can rows by a vertical movement into the space formed beside the slightly tilted row in the tray, the can rows will be guided into the desired nested condition without danger of the seamed portions at the upper and lower extremities of the cans engaging in a manner for interfering with accurate placement of the can rows. As each supporting rod 113 reaches its lowermost position as illustrated at the left in Figure 10, or at the right in Figure 12, the duct extension 187 thereof will be uncovered so as to relieve the suction in the cups and allow the can row previously supported by said cups to fall, suitably guided by the downwardly turned floor 63 or 64. As previously described, the floors 63 and 64 and the associated cup sets 112 operate alternately so that one floor and suction cup set is effecting placement of a row of cans in the tray while the other floor is elevated and having a row complement of cans assembled thereon.

It is to be understood that the trays are fed step distances E as previously described in order to provide a space in which to receive two rows of cans, and the loading devices operate alternately in the manner illustrated in Figures 10 and 12 to place the twelve rows of cans in the spaces provided to receive them by successive advancements of the tray. After the last row of cans has been deposited in the tray in the manner illustrated in Figure 10, the conveyor is moved a double step as indicated by the numeral 7 in Figure 15 so as to place the next succeeding tray in position for receiving two rows of cans in a manner which will be apparent by reference to Figure 12.

After each tray is completely filled in the manner illustrated in Figure 15, it will be automatically released by downward movement of the grippers G about the ends of the chain courses and will be permitted to gravitate onto and be discharged by the feed-off conveyor generally designated 27.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus of the character described wherein is provided a loading station, a tray supporting conveyor, means for advancing the conveyor and trays thereon step-by-step to successively present at said loading station tray spaces wherein to receive two rows of cans, means for guiding movement of the trays in a straight line throughout the loading thereof, means for receiving the cans as they are fed from a source of supply and assembling them in staggered double row relation at said loading station, and means for depositing the assembled staggered double rows of cans in the trays as they are advanced step-by-step double row step distances with the rows of each said assembled double row being staggered with relation one to the other and with rows previously deposited in the tray, thereby to arrange the can rows in compactly nested relation in the trays.

2. In apparatus of the character described wherein is provided a loading station, a tray supporting conveyor, means for advancing the conveyor and trays thereon step-by-step to successively present at said loading station tray spaces wherein to receive two rows of cans, means for guiding movement of the trays in a straight line throughout the loading thereof, means for receiving the cans as they are fed from a source of supply and assembling them in staggered double row relation at said loading station, and means for depositing the assembled staggered double rows of cans in the trays as they are advanced step-by-step double row step distances with the rows of each assembled double row being staggered with relation one to the other and with rows previously deposited in the tray, thereby to arrange the can rows in compactly nested relation in the trays, said guide means comprising a fixed rail engaged by each tray along one side thereof, and said conveyor comprising a pair of spaced chains having spaced transverse draft members each disposed to bear right angular relation to said rail and including gripper means for removably securing a tray thereto to be drawn along therewith.

3. In apparatus of the character described wherein is provided a loading station, a tray supporting conveyor, means for advancing the conveyor and trays thereon step-by-step to successively present at said loading station tray spaces wherein to receive two rows of cans, means for guiding movement of the trays in a straight line throughout the loading thereof, means for receiving the cans as they are fed from a source of supply and assembling them in staggered double row relation at said loading station, and means for depositing the assembled staggered double rows of cans in the trays as they are advanced step-by-step double row step distances with the rows of each said assembled double row being staggered with relation one to the other and with rows previously deposited in the tray, thereby to arrange the can rows in compactly nested relation to the trays, said guide means comprising a fixed rail engaged by each tray along one side thereof, and said conveyor comprising a pair of spaced chains having spaced transverse draft members each disposed to bear right angular relation to said rail and including gripper means for removably securing a tray thereto to be drawn along therewith, and a multiple of spaced rollers having their upper surfaces arranged in a common forwardly and downwardly inclined plane and providing support for the trays as they are advanced step-by-step.

4. In apparatus of the character described wherein is provided a loading station, a tray supporting conveyor, means for advancing the conveyor and trays thereon step-by-step to successively present at said loading station tray spaces wherein to receive rows of cans, means for guiding movement of the trays in a straight line throughout the loading thereof, means for receiving the cans as they are fed from a source of supply and assembling them in staggered double row relation at said loading station, and means for depositing the assembled staggered double rows of cans in the trays as they are advanced step-by-step double row step distances with the rows of each said assembled double row being staggered with relation one to the other and with rows previously deposited in the tray, thereby to arrange the can rows in compactly nested relation in the trays, said guide means comprising a fixed rail engaged by each tray along one side thereof, and said conveyor comprising a pair of spaced chains having spaced transverse draft members each disposed to bear right angular relation to said rail and including gripper means for removably securing a tray thereto to be drawn along therewith, each said gripper including a bracket secured to the respective member and a spring pressed hook automatically attachable with a tray by movement of a tray thereagainst and automatically releasable from the trays as the respective member passes down about sprockets supporting the lower ends of the chains.

5. In apparatus of the character described wherein is provided a loading station, a tray supporting conveyor, means for advancing the conveyor and trays thereon step-by-step to successively present at said loading station tray spaces wherein to receive rows of cans, means for guiding movement of the trays in a straight line throughout the loading thereof, means for receiving the cans as they are fed from a source of supply and assembling them in staggered double row relation at said loading station, and means for depositing the assembled staggered double rows of cans in the trays as they are advanced step-by-step double row step distances with the rows of each said assembled double row being staggered with relation one to the other and with rows previously deposited in the tray, thereby to arrange the can rows in compactly nested relation in the trays, said guide means comprising a fixed rail engaged by each tray along one side thereof, and said conveyor comprising a pair of spaced chains having spaced transverse draft members each disposed to bear right angular relation to said rail and including gripper means for removably securing a tray thereto to be drawn along therewith, and a multiple of spaced rollers having their upper surfaces arranged in a common forwardly and downwardly inclined plane and providing support for the trays as they are advanced step-by-step each said gripper including a bracket secured to the respective member and a spring pressed hook automatically attachable with a tray by movement of a tray thereagainst and automatically releasable from the trays as the respective member passes down about sprockets supporting the lower ends of the chains.

6. In apparatus of the character described wherein is provided a loading station, a tray supporting conveyor, means for advancing the conveyor and trays thereon step-by-step to successively present at said loading station tray spaces wherein to receive rows of cans, means for guiding movement of the trays in a straight line throughout the loading thereof, means for receiving the cans as they are fed from a source of supply and assembling them in staggered double row relation at said loading station, and means for depositing the assembled staggered double rows of can in the trays as they are advanced step-by-step double row step distances with the rows of each said assembled double row being staggered with relation one to the other and with rows previously deposited in the tray, thereby to arrange the can rows in compactly nested relation in the trays, said conveyor comprising a pair of spaced chains having spaced transverse draft members each disposed to bear right angular relation to said rail and including gripper means for removably securing a tray thereto to be drawn along therewith, and a multiple of spaced rollers having their upper surfaces arranged in a common forwardly and downwardly inclined plane and providing support for the trays as they are advanced step-by-step, and said advancing means including a disk having stop notches therein corresponding in spacing to the steps through which the trays are advanced, a shaft carrying said disk and connected in drive relation with said chains, a driver shaft, means including a clutch for connecting the driver shaft in drive relation with the disk carrying shaft, a spring pressed roller engageable in the disk notches for holding the disk and the chains against movement, and control means operable to momentarily shift the clutch and initiate movement of the chains and simultaneously displace the roller from the disk notch in which it is engaged to permit it to ride on the disk and drop into the next advancing notch to discontinue the particular step advancement of the tray.

7. Apparatus as defined in claim 6 in which two of the disk notches are spaced apart a greater distance than the rest corresponding to the distance of the last space to be filled in a tray plus the distance necessary to bring the next tray into position for presenting the first space therein in position for receiving cans when the tray advancing movement controlled by said widely spaced notches is completed.

8. In apparatus of the character described wherein is provided a loading station, a tray conveyor means, means for advancing the conveyor means and can receiving trays step-by-step to successively present at said loading station tray spaces wherein to receive rows of cans and each space of a size for receiving two such can rows, means at said loading station for assembling two rows of cans successively and in distinct positions and for depositing said assembled rows successively in the successively presented tray spaces with the cans of each row staggered with relation to those of the previously deposited row, thereby to arrange the can rows in compactly nested relation in the trays.

9. In apparatus of the character described wherein is provided a loading station, a tray conveyor means, means for advancing the conveyor means and can receiving trays step-by-step to successively present at said loading station tray spaces wherein to receive rows of cans and each space of a size for receiving two such can rows, two movably mounted can row supporting floors disposed at the loading station in parallel relation transversely of and above the path of movement of the trays, means for feeding row complements of can alternately onto said floors, and means for alternately lowering the floors in effecting deposition of said can row complements in the tray spaces as they are successively presented at at loading station.

10. In apparatus of the character described wherein is provided a loading station, a tray conveyor means, means for advancing the conveyor means and can receiving trays step-by-step to successively present at said loading station tray spaces wherein to receive rows of cans and each space of a size for receiving two such can rows, two movably mounted can row supporting floors disposed at the loading station in parallel relation transversely of and above the path of movement of the trays, means for feeding row complements of cans alternately onto said floors, means for alternately lowering the floors in effecting disposition of said can row complements in the tray spaces as they are successively presented at the loading station, and stop means effective to place the can row complements in staggered relation on the floors so that each can row deposited in the tray will be staggered and compactly nested with relation to the preceding row deposited in the tray.

11. In apparatus of the character described wherein is provided a loading station, a tray conveyor means, means for advancing the conveyor means and can receiving trays step-by-step to successively present at said loading station tray spaces wherein to receive rows of cans and each space of a size for receiving two such can rows, means at said loading station for assembling two rows of cans successively and in distinct positions and for depositing said assembled rows successively in the successively presented tray spaces with the cans of each row staggered with relation to those of the previously deposited row, thereby to arrange the can rows in compactly nested relation in the trays, said advancing means including devices for causing one step of advancement to be greater in length than the other steps to the extent of the distance intervening the trailing end of one tray and the advance end of the next succeeding tray and said devices being timed to function during that advancement of each tray which is effective to move the two can rows last deposited therein and completing the loading of the tray away from the loading station.

12. In apparatus of the character described wherein is provided a loading station, a tray conveyor means, means for advancing the conveyor means and can receiving trays step-by-step to successively present at said loading station tray spaces wherein to receive rows of cans and each space of a size for receiving two such can rows, means at said loading station for assembling two rows of cans successively and in distinct positions and for depositing said assembled rows successively in the successively presented tray spaces with the cans of each row staggered with relation to those of the previously deposited row, thereby to arrange the can rows in compactly nested relation in the trays, said advancing means including a pair of spaced chains having spaced cross members having gripper means thereon for removably securing a tray thereto, a multiple of spaced rollers having their upper surfaces arranged in a common forward and downwardly inclined plane and providing support for the trays as they are advanced step-by-step, a disk having stop notches in its periphery two of which are spaced apart the distance of the space between trays plus the step distance of a space of a size for receiving two can rows and each two of the remainder of said notches being spaced the said step distance, a shaft carrying said disk and connected in drive relation with said chains, a driver shaft, means including a clutch for connecting the driver shaft in drive relation with the disk carrying shaft, a spring pressed roller engageable in the disk notches for holding the disk and the chains against movement, and control means operable to momentarily shift the clutch and initiate movement of the chains and simultaneously displace the roller from the disk notch in which it is engaged to permit it to ride on the disk and drop into the next advancing notch to discontinue the particular step advancement of the tray.

13. In apparatus of the character described wherein is provided a loading station, a tray conveyor means, means for advancing the conveyor means and can receiving tray step-by-step to successively present at said loading station tray spaces wherein to receive rows of cans and each space of a size for receiving two such can rows, two movably mounted can row supporting floors disposed at the loading station in parallel relation transversely of and above the path of movement of the trays, means for feeding row complements of cans alternately onto said floors, means for alternately lowering the floors in effecting deposition of said can row complements in the tray spaces as they are successively presented at the loading station, and stop means effective to place the can row complements in staggered relation or the floors so that each row deposited in the tray will be staggered and compactly nested with relation to the preceding row deposited in the tray, said floors being oscillatably mounted so as to be swingable upwardly and downwardly between their elevated can row complement supporting and lowered can row complement depositing positions and so disposed as to act as guide means for facilitating accurate deposition of the can row complements into the trays when in their lowered can row complement depositing position.

14. In apparatus of the character described wherein is provided a loading station, a tray conveyor means, means for advancing the conveyor means and can receiving trays step-by-step to successively present at said loading station tray spaces wherein to receive rows of cans and each space of a size for receiving two such can rows, two movably mounted can row supporting floors disposed at the loading station in parallel relation transversely of and above the path of movement of the trays, means for feeding cans continuously in processional order toward said floods, means for switching the continuously fed cans onto the floors in alternated can row complements, and means for alternately lowering the floors in effecting deposition of said can row complements in the tray spaces as they are successively presented at the loading station.

15. In apparatus of the character described wherein is provided a loading station, a tray conveyor means, means for advancing the conveyor means and can receiving trays step-by-step to successively present at said loading station tray spaces wherein to receive rows of cans and each space of a size for receiving two such can rows, two movably mounted can row supporting floors disposed at the loading station in parallel relation transversely of and above the path of movement of the trays, means for feeding cans continuously in processional order toward said floors, means including a can actuated counter wheel and a can procession diverter gate for switching the continuously fed cans onto the floors in alternated can row complements, and means for alternately lowering the floors in effecting deposition of said can row complements in the tray spaces as they are successively presented at the loading station.

16. In apparatus of the character described wherein is provided a loading station, a tray conveyor means, means for advancing the conveyor means and can receiving trays step-by-step to successively present at said loading station tray spaces wherein to receive rows of cans and each space of a size for receiving two such can rows, two movably mounted can row supporting floors disposed at the loading station in parallel relation transversely of and above the path of movement of the trays, means for feeding row complements of cans alternately onto said floors, a set of suction gripper means over each floor and effective to grip the can row complements and lower them into the trays, and control means for operating the sets of suction gripper means and the floors in timed relation so that while a can row complement is being assembled on one floor the gripper set over the other floor will grip the can row complement assembled thereon and lower it into the tray with the floor moving away from supporting contact beneath the cans and serving to guide movement of the can row complement into the tray.

17. In apparatus of the character described wherein is provided a loading station, a tray conveyor means, means for advancing the conveyor means and can receiving trays step-by-step to successively present at said loading station tray spaces wherein to receive rows of cans and each space of a size for receiving two such can rows, means at said loading station for assembling two rows of cans successively and in distinct positions, means for feeding cans in processional order to said assembling mean, means for depositing the assembled rows successively in the successively presented tray spaces, and means for automatically stopping operation of the depositing means on the occurrence of any break in the continuity of the processional infeeding of cans while maintaining the driving of the feeding means, and for then again automatically resuming operation of the depositing means upon resumption of the proper infeeding of cans, thereby to assure against the depositing in the tray of incomplete rows of cans.

18. Apparatus as defined in claim 16 in which the tray conveyor means supports the trays on a forward and downward incline so that cans in the trays are slightly tilted in the forward direction, and in which the suction gripper means move vertically in depositing can row complements in the trays, thereby causing each slightly tilted row of cans in a tray to act as a guide facilitating accurate placement of the vertically lowered next deposited row of cans.

19. In apparatus for filling cans into trays, tray conveyor means, can row assembling means, two movably mounted row assembling floors arranged in parallel relation, a can actuated counter wheel, means for feeding cans in processional order past said wheel toward said floors, a diverter gate for directing the fed cans onto one or the other of said floors, means operable under control of said wheel after a predetermined row complement of cans has passed onto one floor for shifting the gate so that it will direct the next following row complement of cans onto the other floor, means for moving the conveyor means to advance trays step-by-step beneath said floors, and means to shift said floors to place cans assembled thereon into trays so advanced.

20. In apparatus for filling cans into trays, tray conveyor means, can row assembling means, two movably mounted row assembling floors arranged in parallel relation, a can actuated counter wheel, means for feeding cans in processional order past said wheel toward said floors, a center guide rail disposed between said floors, a travelling conveyor flight associated with each floor and disposed to cooperate with one side of the rail in providing a can width feedway over the respective floor and effective to feed cans therealong, a diverter gate for directing the fed cans onto one or the other of said floors, means operable under control of said wheel after a predetermined row complement of cans has passed onto one floor for shifting the gate so that it will direct the next following row complement of cans onto the other floor, means for moving the tray conveyor means to advance trays step-by-step beneath said floors, and means to shift said floors to place cans assembled thereon into trays so advanced.

21. In apparatus for filling cans into trays, tray conveyor means, can row assembling means, two movably mounted row assembling floors arranged in parallel relation, a can actuated counter wheel, means for feeding cans in processional order past said wheel toward said floors, a center guide rail disposed between said floors, a travelling conveyor flight associated with each floor and disposed to cooperate with one side of the rail in providing a can width feedway over the respective floor and effective to feed cans therealong, a diverter gate for directing the fed cans onto one or the other of said floors, a stop member defining the end of each said can width feedway, said stop members being disposed in staggered relation so as to cause the can rows assembled on the floors to bear staggered relation, means operable under control of said wheel after a predetermined row complement of cans has passed onto one floor for shifting the gate so that it will direct the next following row complement of cans onto the other floor, means for moving the tray conveyor means to advance trays step-by-step beneath said floors, and means to shift said floors to place cans assembled thereon into trays so advanced.

22. In apparatus for filling cans into trays, tray conveyor means, can row assembling means, two movably mounted row assembling floors arranged in parallel relation, a can actuated counter wheel, means for feeding cans in processional order past said wheel toward said floors, a diverter gate for directing the fed cans onto one or the other of said floors, means operable under control of said wheel after a predetermined row complement of cans has passed onto one floor for shifting the gate so that it will direct the next following row complement of cans onto the other floor, means for moving the conveyor means to advance trays step-by-step beneath said floors, and means for displacing said floors to remove the support from beneath the assembled can row complements and permit downward movement thereof into trays so advanced.

23. In apparatus for filling cans into trays, tray conveyor means, can row assembling means, two movably mounted row assembling floors arranged in parallel relation, a can actuated counter wheel, means for feeding cans in processional order past said wheel toward said floors, a diverter gate for directing the fed cans onto one or the other of said floors, means operable under control of said wheel after a predetermined row complement of cans has passed onto one floor for shifting the gate so that it will direct the next following row complement of cans onto the other floor, means for moving the conveyor means to advance trays step-by-step beneath said floors, and means for swingably displacing said floors to remove the support from beneath the assembled can row complements and permit downward movement thereof into trays so advanced and for holding said floors in position for guiding said downward movement of the can row complements.

24. In apparatus for filling cans into trays, tray conveyor means, can row assembling means, two movably mounted row assembling floors arranged in parallel relation, a can actuated counter wheel, means for feeding cans in processional order past said wheel toward said floors, a center guide rail disposed between said floors, a travelling conveyor flight associated with each floor and disposed to cooperate with one side of the rail in providing a can width feedway over the respective floor and effective to feed cans therealong, a diverter gate for directing the fed cans onto one or the other of said floors, a stop member defining the end of each said can width feedway, said stop members being disposed in staggered relation so as to cause the can rows assembled on the floors to bear staggered relation, means operable under control of said wheel after a predetermined row complement of cans has passed onto one floor for shifting the gate so that it will direct the next following row complement of cans onto the other floor, means for moving the tray conveyor means to advance the trays step-by-step beneath said floors, and means for displacing said floors to remove the support from beneath the assembled can row complements and permit downward movement thereof into trays so advanced.

25. In apparatus for filling cans into trays, tray conveyor means, can row assembling means, two movably mounted row assembling floors arranged in parallel relation, a can actuated counter wheel, means for feeding cans in processional order past said wheel toward said floors, a center guide rail disposed between said floors, a traveling conveyor flight associated with each floor and disposed to cooperate with one side of the rail in providing a can width feedway over the respective floor and effective to feed cans therealong, a diverter gate for directing the fed cans onto one or the other of said floors, a stop member defining the end of each said can width feedway, said stop members being disposed in staggered relation so as to cause the can rows assembled on the floors to bear staggered relation, means operable under control of said wheel after a predetermined row complement of cans has passed onto one floor for shifting the gate so that it will direct the next following row complement of cans onto the other floor, means for moving the tray conveyor means to advance the trays step-by-step beneath said floors, and means for swingably displacing said floors to remove the support from beneath the assembled can row complements and permit downward movement thereof into trays so advanced and for holding said floors in position for guiding said downward movement of the can row complements.

26. Apparatus as defined in claim 19 in which the counter wheel controlled gate shifting means includes an actuator cylinder having a reciprocable piston therein operatively connected with the gate for shifting the same, and valve means operable each time the counter wheel has been moved a number of times corresponding to the predetermined number of cans comprising a can row complement to render fluid pressure effective at one end or the other of said cylinder for shifting the gate.

27. Apparatus as defined in claim 19 in which the counter wheel controlled gate shifting means includes an actuator cylinder having a reciprocable piston therein operatively connected with the gate for shifting the same, a vacuum source, a duct opening to atmosphere, and valve means operable each time the counter wheel has been moved a number of times corresponding to the predetermined number of cans comprising a can row complement to connect one end of the cylinder with the vacuum source and the other end of the cylinder to atmosphere for alternately shifting the gate.

28. Apparatus as defined in claim 19 in which the counter wheel controlled gate shifting means includes an actuator cylinder having a reciprocable piston therein operatively connected with the gate for shifting the same, a fixed valve head, a gear couple including a shaft carrying one of the gears, a valve member rotatable with said shaft with a face thereof contacting a face of said head, two ducts opening through said head face at diametrically oppositely disposed points with relation to the center of rotation of said valve member, said valve member having two ducts therein in position for registering simultaneously with both head ducts twice but in alternation during each complete revolution of the valve member thereby to be operable each time the counter wheel has been moved a number of times corresponding to the predetermined number of cans comprising a can row complement to connect one end of the cylinder with the vacuum source and the other end of the cylinder to atmosphere for alternately shifting the gate.

29. In apparatus of the character described, can row assembling means, two movably mounted row assembling floors arranged in parallel relation, a can actuated counter wheel, means for feeding cans in processional order past said wheel toward said floors, a diverter gate for directing the fed cans onto one or the other of said floors, means operable under control of said wheel after a predetermined row complement of cans has passed onto one floor for shifting the gate so that it will direct the next following row complement of cans onto the other floor, means for displacing said floors to remove the support from beneath the assembled can row complements and permit downward movement thereof, suction gripper means operable in timed relation to said floor displacing means for gripping the can row complements and lowering them from the feedways, and support means for receiving the can row complements from the gripper means.

30. In apparatus of the character described, can row assembling means, two movably mounted row assembling floors arranged in parallel relation, a can actuated counter wheel, means for feeding cans in processional order past said wheel toward said floors, a center guide rail disposed between said floors, a travelling conveyor flight associated with each floor and disposed to cooperate with one side of the rail in providing a can width feedway over the respective floor and effective to feed cans therealong, a diverter gate for directing the fed cans onto one or the other of said floors, a stop member defining the end of each said can width feedway, said stop members being disposed in staggered relation so as to cause the can rows assembled on the floors to bear staggered relation, means operable under control of said wheel after a predetermined row complement of cans has passed onto one floor for shifting the gate so that it will direct the next following row complement of cans onto the other floor, means for displacing said floors to remove the support from beneath the assembled can row complements and permit downward movement thereof, suction gripper means operable in timed relation to said floor displacing means for gripping the can row complements and lowering them from the feedways, and support means for receiving the can row complements from the gripper means.

31. Apparatus as defined in claim 29 in which the suction gripper means comprises a hollow manifold disposed over each floor and having a suction cup depending therefrom for engagement with each can on the underlying floor, vertically reciprocable rod means supporting each manifold and having a duct opening through one side thereof and communicating with the interior of the manifold, and means providing a slide guide for both gripper means rod means and having provision for opening communication between the manifolds and atmosphere at the lower travel position at which the can row complements are to be released onto the support means and provision at a higher point effective after limited lowering of the cups and as they contact the floor supported can row complements for connecting the manifolds with a suction source.

32. In apparatus of the character described, can row assembling means, two movably mounted row assembling floors arranged in parallel relation, a can actuated counter wheel, means for feeding cans in processional order past said wheel toward said floors, a center guide rail disposed between said floors, a travelling conveyor flight associated with each floor and disposed to cooperate with one side of the rail in providing a can width feedway over the respective floor and effective to feed cans therealong, a diverter gate for directing the fed cans onto one or the other of said floors, a stop member defining the end of each said can width feedway, said stop members being disposed in staggered relation so as to cause the can rows assembled on the floors to bear staggered relation, means operable under control of said wheel after a predetermined row complement of cans has passed onto one floor for shifting the gate so that it will direct the next following row complement of cans onto the other floor, suction gripper means operable in timed relation to said floor displacing means for gripping the can row complements and lowering them from the feedways, and support means for receiving the can row complements from the gripper means, means for swingably displacing said floors to remove the support from beneath the assembled can row complements and permit downward movement thereof and for holding said floors in position for guiding said downward movement of the can row complements, said suction gripper means comprising a hollow manifold disposed over each floor and having a suction cup depending therefrom for engagement with each can on the underlying floor, vertically reciprocable rod means supporting each manifold and having a duct opening through one side thereof and communicating with the interior of the manifold, and means providing a slide guide for both gripper means rod means and having provision for opening communication between the manifold and atmosphere at the lower travel position at which the can row complements are to be released onto the support means and provision at a higher point effective after limited lowering of the cups and as they contact the floor supported can row complements for connecting the manifolds with a suction source.

33. In apparatus of the character described, can row assembling means, two movably mounted row assembling floors arranged in parallel relation, a can actuated counter wheel, means for feeding cans in processional order past said wheel toward said floors, a center guide rail disposed between said floors, a travelling conveyor flight associated with each floor and disposed to cooperate with one side of the rail in providing a can width feedway over the respective floor and effective to feed cans therealong, a diverter gate for directing the fed cans onto one or the other of said floors, a stop member defining the end of each said can width feedway, said stop members being disposed in staggered relation so as to cause the can rows assembled on the floors to bear staggered relation, means operable under control of said wheel after a predetermined row complement of cans has passed onto one floor for shifting the gate so that it will direct the next following row complement of cans onto the other floor, suction gripper means operable in timed relation to said floor displacing means for gripping the can row complements and lowering them from the feedways, support means for receiving the can row complements from the gripper means, means for swingably displacing said floors to remove the support from beneath the assembled can row complements and permit downward movement thereof and for holding said floors in position for guiding said downward movement of the can row complements, said suction gripper means comprising a hollow manifold disposed over each floor and having a suction cup depending therefrom for engagement with each can on the underlying floor, vertically reciprocable rod means supporting each manifold and having a duct opening through one side thereof and communicating with the interior of the manifold, and means providing a slide guide for both gripper means a manifold supporting rod means and having provision for opening communication between the manifolds and atmosphere at the lower travel position at which the can row complements are to be released onto the support means and provision at a higher point effective after limited lowering of the cups and as they contact the floor supported can row complements for connecting the manifolds with a suction source, and means for moving the floors and manifolds in timed relation comprising a crosshead attached to each rod means, rotary cam controlled means for alternately reciprocating the crossheads, bell crank means stationarily pivoted and having arms thereof pitman connected with cranks extending from the floors, and cam slides movable with the crossheads and having actuator grooves therein engaged by rollers carried by the other arms of the bell crank means.

34. In apparatus of the character described wherein is provided a loading station, a tray conveyor means, means for advancing the conveyor means and can receiving trays step-by-step to successively present at said loading station tray spaces wherein to receive rows of cans and each space of a size for receiving two such can rows, means at said loading station for assembling two rows of cans successively and in distinct positions, means for feeding cans in processional order to said assembling means, means for depositing the assembled rows successively in the successively presented tray spaces, and means for automatically stopping operation of the depositing means on the occurrence of any break in the continuity of the processional infeeding of cans while maintaining the driving of the feeding means, and for then again automatically resuming operation of the depositing means upon resumption of the proper infeeding of cans thereby to assure against the depositing in the tray of incomplete rows of cans, said can row assembling means including two movably mounted can row supporting floors disposed in parallel relation transversely of and above the path of movement of the trays, a can procession diverter gate effective to direct cans onto one or the other of said floors, and a can actuated counter means for shifting the gate each time a can row complement has been directed onto one of said floors.

35. In apparatus of the character described wherein is provided a loading station, a tray conveyor means, means for advancing the conveyor means and can receiving trays step-by-step to successively present at said loading station tray spaces wherein to receive rows of cans and each space of a size for receiving two such can rows, means at said loading station for assembling two rows of cans successively and in distinct positions, means for feeding cans in processional order to said assembling means, means for depositing the assembled rows successively in the successively presented tray spaces, means for automatically stopping operation of the depositing means on the occurrence of any break in the continuity of the processional infeeding of cans while maintaining the driving of the feeding means, and for then again automatically resuming operation of the depositing means upon resumption of the proper infeeding of cans, thereby to assure against the depositing in the tray of incomplete rows of cans, said can row assembling means including two movably mounted can row supporting floors disposed in parallel relation transversely of and above the path of movement of the trays, a can procession diverter gate effective to direct cans onto one or the other of said floors, and a can actuated counter means for shifting the gate each time a can row complement has been directed onto one of said floors, and said depositing means including a set of suction gripper means over each floor and effective to grip the can row complements and lower them into the trays, and means for moving the floors out of supporting position beneath the cans as the gripper means takes over the support thereof.

GERALD L. ARDRON.

REFERENCES CITED

The following references are of record in the file of this patent:

UNITED STATES PATENTS

| Number | Name | Date |
|---|---|---|
| 733,460 | Cormack | July 14, 1903 |
| 1,067,706 | Zickerman | July 15, 1913 |
| 1,090,855 | Jagenberg | Mar. 24, 1914 |
| 1,247,722 | Rogers et al. | Nov. 27, 1917 |
| 1,288,962 | Moore | Dec. 24, 1918 |
| 1,558,016 | Kiefer | Oct. 20, 1925 |
| 1,558,691 | McDermott | Oct. 27, 1925 |
| 1,819,888 | Gabel | Aug. 18, 1931 |
| 1,896,639 | Meyer et al. | Feb. 7, 1933 |
| 2,069,872 | Burns | Feb. 9, 1937 |
| 2,193,354 | Thys | Mar. 12, 1940 |
| 2,207,349 | Laxo | July 9, 1940 |
| 2,277,688 | Cattonar et al. | Mar. 31, 1942 |
| 2,280,854 | Rooney | Apr. 28, 1942 |
| 2,318,598 | Davis | May 11, 1943 |
| 2,319,167 | Stewart | May 11, 1943 |
| 2,400,484 | Campana | May 21, 1946 |